United States Patent Office

2,785,990
Patented Mar. 19, 1957

2,785,990

METHOD OF SURFACE TREATING ZINC OXIDE

Marvin K. Coulter, Columbus, Ohio, assignor to American Zinc, Lead & Smelting Company, St. Louis, Mo., a corporation of Maine No Drawing. Application February 8, 1954,
Serial No. 408,986

5 Claims. (Cl. 106—296)

This invention relates to methods for surface treating American Process zinc oxide to improve the speed of incorporation of the zinc oxide in rubber and to improve the quality of the rubber in which the zinc oxide coated in accordance with the present invention has been incorporated.

Heretofore it has been proposed to surface treat zinc oxide particles with fatty acids as in Patent No. 1,997,925 granted to Alwin C. Eide on April 16, 1935. This patent proposes the use of a fatty acid in amounts ranging from 0.2 to 1.0% added to the zinc oxide in any convenient way at temperatures ranging between 150° C. and 300° C. to vaporize the fatty acid in the body of the zinc oxide to improve its incorporation therewith. A later Patent No. 2,303,330 dated December 1, 1942 and granted to Silver and Bridgewater relates to coating zinc oxide employing propionic acid so that the zinc oxide particles are coated with zinc propionate. 1 to 3% of the acid is used and this patent assumes that the propionic acid is evenly distributed throughout the body of the zinc oxide and that the coating of zinc propionate is uniform on the surfaces of the zinc oxide particles.

Another Patent No. 2,303,329 granted December 1, 1942 to Howard Cyr relates to the same subject matter disclosing the treatment of low acidity zinc oxide with propionic acid to surface coat the zinc oxide particles with zinc propionate.

Patent No. 2,348,883 granted May 16, 1944 to Howard Cyr discloses the use of acetic acid in the coating of zinc oxide particles and Patent No. 2,036,570 of April 7, 1936 granted to H. A. Depew discloses the use of stearic acid in the coating of zinc oxide particles.

All of these prior disclosures relating to the coating of zinc oxide particles have certain disadvantages particularly in assuring the uniform distribution of the acid throughout the body of the zinc oxide before the reaction takes place that coats the zinc oxide particles and to thus insure that all of the zinc oxide particles are uniformly coated. These technical difficulties add to the cost of the coating operation and since the zinc oxide particles are not uniformly coated the resulting product cannot be dispersed as easily in rubber and the rubber products do not have all the desired physical properties.

I have found that the disadvantages of the prior art processes and products may be overcome and certain advantages obtained not heretofore possible if normal zinc propionate, $Zn(C_3H_5O_2)_2$, is blended with the zinc oxide to be treated in amounts from 0.2% to 1% by weight and the resulting mixture thereafter milled, screened, and heated, if necessary, at temperatures between 140° C. and 300° C. The dispersed zinc propionate reacts uniformly throughout the mass of the zinc oxide to coat the zinc oxide particles with a basic zinc propionate in accordance with the chemical reaction $$Zn(C_3H_5O_2)_2 + ZnO = ZnO.Zn(C_3H_5O_2)_2$$

and the resulting coated zinc oxide product is in every way equal to and in many of its properties superior to the products which are made by reacting propionic acid directly with the zinc oxide by the various methods of the patents identified above.

It is accordingly an object of the present invention to provide methods for surface treating zinc oxide particles to coat them with a basic zinc propionate that are simpler and more economical to operate than methods heretofore proposed.

Another object is to provide such methods which provide a more uniform and thorough coating of the zinc oxide particles.

Another object is to provide a novel product of such methods, namely, zinc oxide particles uniformly coated with a basic zinc propionate.

Other and further objects of the present invention will appear from the following description of an illustrative embodiment of the same.

The methods of the present invention are capable of various procedural steps and an illustrative embodiment of the same is described hereinafter to illustrate the same. This illustrative embodiment should not be construed as defining or limiting the invention and reference should be had to the appended claims for this purpose.

The novel methods and products of the present invention are based upon the discovery that an improved product enhancing the properties of the rubber in which it is incorporated can be obtained when zinc oxide particles are uniformly coated with a basic zinc propionate. I have also found that a uniform coating of basic zinc propionate can be obtained on the zinc oxide particles in a more convenient manner than by incorporating free propionic acid in the zinc oxide by blending with the zinc oxide a small percentage from 0.2 to 1% and preferably 0.3 to 0.5% of normal zinc propionate. Thereafter the mixture is thoroughly agitated at temperatures in the neighborhood of 140° C. Preferably the mixture of zinc oxide and normal zinc propionate is best obtained by admitting normal zinc propionate to the stream of zinc oxide particles as the zinc oxide particles pass to the usual milling and screening steps.

Normal zinc propionate can be obtained by diluting commercial propionic acid in water and agitating this solution with a stoichiometrical proportion of zinc oxide at temperatures not less than 80° C. The completed reaction is evidenced by the formation of a mass of crystals in suspension and these crystals are filtered out, dried and pulverized and are then ready for incorporation in the zinc oxide. As noted above, this incorporation best occurs by feeding a very small stream of these pulverized crystals of normal zinc propionate into the stream of zinc oxide particles as it passes to the dry milling and screening operations which are employed to pulverize the zinc oxide products. If this stream of zinc oxide particles conveys 5,000 pounds of zinc oxide per hour the feed of normal zinc propionate should approximate 15 pounds per hour. The mixture of normal zinc propionate and zinc oxide is thoroughly agitated and blended while dry in the conventional milling and screening operations and the product as discharged from the mills is screened again and packed in the bags and is ready for use. No special heating step is required in this operation since the temperature in the mills usually exceeds 140° C. which is a desirable temperature for assuring completion of the reaction between the normal zinc propionate and the zinc oxide particles.

It has been found that if the reaction between the normal zinc propionate and the zinc oxide is not completed during the milling and screening operations, the coating reaction with the uncoated zinc oxide particles to form a coating of basic zinc propionate thereon will proceed slowly and ultimately to completion in the package since the zinc propionate is thoroughly and intimately blended in the body of the zinc oxide. This result is obtained even though there are relatively few crystals of zinc propionate in a mixture of .3% normal zinc propionate and zinc oxide since the crystals are thoroughly dispersed in the body of the zinc oxide and the vapor pressure of normal zinc propionate is sufficient to effect the coating of the majority of the zinc oxide particles with the basic zinc propionate in a relatively short time.

As noted above, the zinc oxide coated product of the methods of the present invention are more uniformly coated and are therefore a better product than the coated zinc oxide particles of the prior art. Normal zinc propionate has a definite vapor pressure at room temperatures and basic zinc propionate has a lower vapor pressure and sublimes at a higher temperature than normal zinc propionate. If a small quantity of normal zinc propionate is dispersed in a large mass of zinc oxide and the mixture heated to 140° C. normal zinc propionate will react with a stoichiometrical amount of zinc oxide to form the basic zinc propionate coating. This reaction may be effected slowly and after the normal zinc propionate has been dispersed throughout the body of the zinc oxide. In this way the normal zinc propionate vapors may contact the unreacted zinc oxide to form the basic zinc propionate coating upon the greatest possible surface area of the zinc oxide to uniformly coat the same.

In the prior art a very active reactant such as propionic acid is sprayed or mixed into a much larger quantity of very reactive zinc oxide. Normal and basic zinc propionates are immediately formed and since a greater proportion of basic zinc propionate is formed rapidly at the time the propionic acid is added, the thoroughness of the surface coating of the zinc oxide particles with basic zinc propionate is greatly impaired and the particles are not uniformly coated.

Thus it is apparent that methods of the present invention produce a product which has a much more uniform coating of basic zinc propionate and this product has enhanced properties when dispersed in rubber improving the properties of the rubber in which it is used.

As further evidence of the improved coating on the zinc oxide particles of the present invention it has been found that a given quantity of zinc oxide treated in accordance with the present invention can be packed in a smaller bag than untreated zinc oxide particles. As an example, zinc oxide that prior to treatment with the present invention would pack 34 pounds per cubic foot will pack after being processed with 0.3% zinc propionate in accordance with this invention as high as 40 to 45 pounds per cubic foot. This is a distinct and added advantage of the present invention.

The improved properties of the zinc oxide particles coated in accordance with the present invention and the enhanced properties of the rubber in which the so treated zinc oxide is incorporated are further demonstrated by the results of tests made upon various rubber formulae. In one formula 100 parts by weight of natural rubber were mixed with 100 parts by weight of zinc oxide, 3 parts by weight of sulfur, 1 part by weight of stearic acid, and 1 part by weight of 2-mercaptobenzothiazole, an accelerator. This mixture was vulcanized for 45 minutes at 259° F. The following table shows the physical properties of this mixture when regular zinc oxide was used therein, when zinc oxide coated in accordance with the present invention was used therein, and when zinc oxide coated in accordance with the teachings of the prior art was employed.

| ZnO | Tensile Strength | 400% Modulus | Elongation |
| --- | --- | --- | --- |
| Regular ZnO | 3,200 | 1,010 | 670 |
| ZnO of the present invention | 3,330 | 1,195 | 655 |
| ZnO of the prior art | 3,150 | 1,160 | 640 |

In another formula, using basic acceleration rather than acid acceleration, a mixture of 100 parts by weight of natural rubber, 100 parts by weight zinc oxide, 3 parts by weight of sulfur, and 1 part by weight of butyraldehydeaniline was vulcanized for 45 minutes at 259° F. The following table shows that zinc oxide particles coated in accordance with the prior art are extremely slow curing under these conditions and that zinc oxide particles treated in accordance with the present invention do not destroy the effectiveness of basic acceleration.

| ZnO | Tensile Strength | 400% Modulus | Elongation |
| --- | --- | --- | --- |
| Regular ZnO | 3,860 | 1,420 | 665 |
| ZnO of the present invention | 3,920 | 1,420 | 645 |
| ZnO of the prior art | 1,775 | 520 | 685 |

The same improved results utilizing zinc oxide coated in accordance with the present invention are demonstrated by a formula employing 100 parts by weight of artificial rubber, 50 parts by weight of carbon black, other and conventional accelerators and ingredients including sulfur and stearic acid, and 5 parts by weight of zinc oxide, the mixture being vulcanized for 45 minutes at 280° F.

| ZnO | Tensile Strength | 300% Modulus | Elongation |
| --- | --- | --- | --- |
| Regular ZnO | 2,550 | 2,000 | 400 |
| ZnO of the present invention | 2,780 | 2,310 | 400 |
| ZnO of the prior art | 2,770 | 1,690 | 435 |

The improved and uniform coating of the zinc oxide particles treated in accordance with the present invention is further shown by a comparison of the time in minutes required to incorporate the zinc oxide in rubber mixtures.

| Type Test | Incorporation Time in Minutes | | |
| --- | --- | --- | --- |
| | Reg. ZnO | ZnO of present invention | ZnO of prior art |
| (1) Small Laboratory Mill incorporating 200 grams of ZnO in 200 grams of Natural Rubber | 3 | 2 | 3.5 |
| (2) Model Banbury Mixer incorporating 70% ZnO in 30% Natural Rubber | 11.5 | 7.25 | 30 |
| (3) Model Banbury Mixer incorporating 80% ZnO in 20% Natural Rubber. Results are the average of several runs | 8.01 | 6.26 | 8.16 |
| (4) Commercial test in #11 Banbury mixer incorporating 75% ZnO in 25% GR-S synthetic rubber | 20 to 25 | 8 | 8 to 10 |

It has also been found that rubber in which zinc oxide coated in accordance with the present invention was dispersed and then aged for 24 hours at 100° C. retains 66.5% of its original tensile strength while rubber in which regular zinc oxide was dispersed retained only 60.3% of its original tensile strength. This demonstrates that zinc oxide surface coated in accordance with the present invention has inherent antioxidant properties. Similar tests showed that basic zinc propionate is superior to normal zinc propionate in the rates of 79.5% to 57.5%.

The improved physical properties of zinc oxide treated in accordance with the present invention are also shown by a determination of the average water soluble salt content as follows:

| | Percent |
| --- | --- |
| Regular zinc oxide | .25 |
| Zinc oxide coated in accordance with present invention | .30 |
| Zinc oxide coated in accordance with prior art | .94 |

The improved and uniform coating of zinc oxide particles with basic zinc propionate in accordance with the present invention has the further advantage over the coated zinc oxide of the prior art that it reabsorbs less moisture than zinc oxide coated with normal zinc propionate. The following table also shows that the method of the present invention provides a much more uniform coating of the zinc oxide particles than is possible in the prior art. In this table the first group of four oxides show first an untreated zinc oxide and then three zinc oxides treated by the method of Patent No. 2,303,330. Practically no reduction in the percentage of water reabsorption before and after treatment is found. Zinc oxides treated in accordance with the present invention are listed in items 5 to 16 and show an average water reabsorption of 0.081%. Items 17 to 28 inclusive show an average water reabsorption of untreated zinc oxide particles of 0.126%. Thus the average reduction in water reabsorption of zinc oxide treated in accordance with the present invention is 35%.

| No. | Description | Percent $H_2O$ Reabsorbed, 96 Hrs. |
|---|---|---|
| 1 | Untreated Zinc Oxide | 0.290 |
| 2 | Zinc Oxide of Patent No. 2,303,330 | 0.275 |
| 3 | do | 0.275 |
| 4 | do | 0.247 |
| Average | | 0.272 |
| 5 | Zinc Oxide of Present Invention | 0.052 |
| 6 | do | 0.066 |
| 7 | do | 0.065 |
| 8 | do | 0.090 |
| 9 | do | 0.078 |
| 10 | do | 0.085 |
| 11 | do | 0.095 |
| 12 | do | 0.080 |
| 13 | do | 0.095 |
| 14 | do | 0.090 |
| 15 | do | 0.088 |
| 16 | do | 0.085 |
| Average | | 0.081 |
| 17 | Zinc Oxide Untreated | 0.180 |
| 18 | do | 0.055 |
| 19 | do | 0.210 |
| 20 | do | 0.120 |
| 21 | do | 0.080 |
| 22 | do | 0.115 |
| 23 | do | 0.100 |
| 24 | do | 0.167 |
| 25 | do | 0.130 |
| 26 | do | 0.147 |
| 27 | do | 0.108 |
| 28 | do | 0.095 |
| Average | | 0.126 |

It will now be apparent to those skilled in the art that by the present invention novel methods of coating zinc oxide are provided which in every way satisfy the objectives described above and new coated zinc oxide products are obtained which have desirable properties not found in the prior art and which when incorporated in rubber improve the physical properties of the rubber.

Changes in the modifications to the above-described illustrative embodiment of the method of the present invention may now occur to those skilled in the art without departing from the present inventive concept and reference should be had to the appended claims to determine the scope thereof.

What is claimed is:

1. In a method for coating zinc oxide particles, the steps of intimately mixing from 0.2 to 1% by weight normal of zinc propionate with the zinc oxide and then dry milling and screening the mixture at temperatures in the range 180–240° C. until the zinc oxide reacts chemically with the normal zinc propionate and is coated solely with basic zinc propionate.

2. In a method for surface coating finely divided zinc oxide, the steps of mixing from 0.2 to 1% by weight of normal zinc propionate in the zinc oxide, thoroughly agitating the mixture at temperatures in the range 140°–280° C. until the zinc oxide reacts chemically with the normal zinc propionate and the formation of basic zinc propionate coating on the zinc oxide is completed, and cooling and packing the mixture.

3. In a method for surface coating finely divided zinc oxide, the steps of mixing from 0.2 to 1% by weight of normal zinc propionate in the zinc oxide, thoroughly agitating the dry mixture at temperatures in the range 140–280° C., packaging the mixture with the initial reaction still incomplete and allowing the mixture to remain packaged and unused until the zinc oxide reacts chemically with the normal zinc propionate and the formation of basic zinc propionate coating on the zinc oxide is completed.

4. In a method for surface coating finely divided zinc oxide, the steps of adding from 0.2 to 1% by weight of normal zinc propionate to a stream of zinc oxide particles passing to a mill, milling and screening the mixture at temperatures in the range 140°–280° C. until the zinc oxide reacts chemically with the normal zinc propionate and is substantially coated with basic zinc propionate, packaging the mixture with the initial reaction still incomplete and allowing the mixture to remain packaged until the chemical reaction is completed and all of the zinc oxide is coated with basic zinc propionate.

5. In a method for coating zinc oxide particles, the steps of intimately mixing 0.2–1.0% pulverized normal zinc propionate with finely divided zinc oxide and maintaining the temperature of the mixture in range 140°–280° C. until the zinc oxide reacts chemically with the normal zinc propionate and is coated solely with basic zinc propionate.

References Cited in the file of this patent

UNITED STATES PATENTS

| 1,216,182 | Sullivan | Feb. 13, 1917 |
| 1,979,380 | Gardner | Nov. 6, 1934 |
| 2,068,066 | O'Brien | Jan. 19, 1937 |
| 2,261,104 | Vogel | Dec. 16, 1941 |
| 2,303,329 | Cyr | Dec. 1, 1942 |
| 2,303,330 | Silver et al. | Dec. 1, 1942 |